United States Patent
Sung et al.

(10) Patent No.: US 7,359,013 B2
(45) Date of Patent: Apr. 15, 2008

(54) DISPLAY CAPABLE OF SELECTIVELY DISPLAYING TWO-DIMENSIONAL AND THREE-DIMENSIONAL IMAGES

(75) Inventors: Gee-young Sung, Daegu-si (KR); Byoung-so Choi, Seoul (KR); Seung-ho Nam, Seongnam-si (KR); Ju-hyun Lee, Seoul (KR)

(73) Assignee: Samsung Electornics Co., Ltd., Suwon (KR)

( * ) Notice: Subject to any disclaimer, the term of this patent is extended or adjusted under 35 U.S.C. 154(b) by 329 days.

(21) Appl. No.: 11/003,352

(22) Filed: Dec. 6, 2004

(65) Prior Publication Data

US 2005/0157223 A1 Jul. 21, 2005

(30) Foreign Application Priority Data

Dec. 5, 2003 (KR) ............ 10-2003-0087984

(51) Int. Cl.
*G02F 1/1335* (2006.01)
(52) U.S. Cl. .................. 349/69; 349/15; 349/96
(58) Field of Classification Search ............ 349/15, 349/96, 69
See application file for complete search history.

(56) References Cited

U.S. PATENT DOCUMENTS 6,512,122 B2* 1/2003 Lin et al. .............. 548/440
6,610,396 B2* 8/2003 Kimura et al. ........... 428/323
6,628,086 B2* 9/2003 Hayashi et al. ......... 315/169.3
6,641,933 B1* 11/2003 Yamazaki et al. ........ 428/690

FOREIGN PATENT DOCUMENTS

| JP | 3-119889 A | 5/1991 |
|---|---|---|
| JP | 7-181429 A | 7/1995 |
| JP | 2000-132152 A | 5/2000 |
| JP | 2001-211465 A | 8/2001 |
| JP | 2003-222858 A | 8/2003 |
| JP | 2003-248246 A | 9/2003 |
| JP | 2003-337390 A | 11/2003 |
| KR | 1998-0010482 A | 4/1998 |
| KR | 2003-0022582 A | 3/2003 |

* cited by examiner

*Primary Examiner*—Mike Qi
(74) *Attorney, Agent, or Firm*—Sughrue Mion, PLLC

(57) ABSTRACT

A 2D/3D (two-dimensional/three-dimensional) display including: an image display panel; and a light source which selectively emits light for displaying two-dimensional image and light for displaying three-dimensional image on the image display panel. The image display panel can be a liquid crystal panel, and the light source can be a flat light source having an array of light emitting cells which are turned on and off depending on an applied voltage.

14 Claims, 8 Drawing Sheets

DISPLAY CAPABLE OF SELECTIVELY DISPLAYING TWO-DIMENSIONAL AND THREE-DIMENSIONAL IMAGES

BACKGROUND OF THE INVENTION

This application claims the priority of Korean Patent Application No. 2003-87984, filed on Dec. 5, 2003, in the Korean Intellectual Property Office, the disclosure of which is incorporated herein in its entirety by reference.

1. Field of the Invention

The present invention relates to a flat panel display, and more particularly, to a flat panel display capable of selectively displaying two-dimensional (2D) and three-dimensional (3D) images.

2. Description of the Related Art

In general, a 3D image can be implemented using a viewer's binocular disparity. With the 3D image implementing method using the binocular disparity, there is a method where a viewer wears glasses for displaying the 3D image such as polarization glasses or liquid crystal (LC) shutter glasses, and a method where the viewer observes in his/her naked eyes using a unit having a lenticular lens, a parallax barrier, a parallax illumination or the like. The former method is called "stereoscopy method" and the latter is called "autostereoscopy method".

The stereoscopy method is applied to a place where several persons can view an image using a polarization projector, such as a theater. Additionally, the autostereoscopy method can be applied to a game display, a home television set, an exhibition display and the like, which is used by a single person or a small number of people.

A current study is concentrated on the autostereoscopy method for implementing the 3D image, and several products relating to this are on sale.

3D-image display devices which are being currently introduced can implement only the 3D image, and are available at a higher price than a 2D-image display device.

However, since 3D image contents are not actively supplied, the high-priced 3D-image display device cannot satisfy customers' interest.

Accordingly, recent study has been made on a method for manufacturing a display device for selectively implementing the 2D and 3D images, and various products are being introduced.

Among the introduced products, there is a display for selectively displaying the 2D and 3D images using a liquid crystal shutter provided at a rear of a Thin Film Transistor Liquid Crystal Display (TFT-LCD). The display has excellent 2D/3D-image variable characteristics. However, due to a thickness of the liquid crystal shutter, the display is increased in thickness. Further, since the display uses a polarizer film, it is difficult to achieve light efficiency as desired.

FIG. 1 illustrates a conventional 3D-image exclusive flat panel display employing a parallax illumination way.

Referring to FIG. 1, the conventional 3D-image exclusive display includes a general Liquid Crystal Display (LCD) 10 for displaying an image thereon, and a slit plate 14 installed at a rear of a general LCD 10. The slit plate 14 is spaced apart from the LCD 10 by a predetermined distance (dS). A plurality of slits 16 are provided on a surface of the slit plate 14 facing LCD 10. Light incident on the slit plate 14 is incident on the LCD 10 through the slit 16. Accordingly, the slit 16 is a rod source for the LCD 10. In FIG. 1, a reference numeral 12 represents pixels of the LCD 10.

The 3D-image exclusive display shown in FIG. 1 has an advantage in that the structure is simple, and luminance is not only excellent, but also Moire interference is reduced in comparison to the display employing the parallax barrier method.

However, since the 3D-image exclusive display shown in FIG. 1 employs a fixed 3D method using a fixed slit plate 16, the viewer can view only the 3D image in which left and right images are separated. For all that, as described above, since 3D contents are infrequently supplied at present, and it is expected that the 2D and 3D contents will coexist for the foreseeable future, it is not easy for a customer to willingly purchase the high-priced 3D-image exclusive display.

Accordingly, a display for selectively displaying the 2D image and the 3D image (hereinafter referred to as "2D/3D display") is required.

FIG. 2 illustrates a conventional 2D/3D display. In FIG. 2, a reference numeral A1 represents a liquid crystal panel for displaying the image thereon using a thin film transistor ("TFT") as a switch element.

Referring to FIG. 2, a liquid crystal shutter A2 is provided at a rear of the liquid crystal panel A1, and a light source A3 is provided at a rear of the liquid crystal shutter A2. The light source A3 is a backlight used for the general LCD A1. An operation principle of the liquid crystal shutter A2 is identical with that of the liquid crystal panel A1. Accordingly, an electric signal applied to the liquid crystal shutter A2 is controlled to allow a specific region of the liquid crystal shutter A2 to function as a transmission region through which an incident light from the light source A3 passes, or to function as a shading region by which the incident light is shaded. Further, the electric signal applied to the liquid crystal shutter A2 is controlled to allow a region of the liquid crystal shutter A2 corresponding to the slit 16 of the display shown in FIG. 1 to function as the transmission region, and to allow a remaining region of the liquid crystal shutter A2 to function as the shading region. In case that the liquid crystal shutter A2 is driven as above, the 2D/3D display shown in FIG. 2 becomes identical with the 3D-image exclusive display shown in FIG. 1.

The electric signal applied to the liquid crystal shutter A2 is controlled to allow an entire region of the liquid crystal shutter A2 to function as the transmission region. In this case, the 2D/3D display shown in FIG. 2 becomes identical with a 2D-image display.

As such, the conventional 2D/3D display shown in FIG. 2 has an advantage in that since the liquid crystal shutter A2 can be used to selectively implement a 2D-image exclusive light source and a 3D-image exclusive light source, the 2D or 3D image can be selectively embodied.

However, the 2D/3D display shown in FIG. 2 has disadvantages in that the display can be increased in thickness and its manufacture cost can be also increased due to the liquid crystal shutter A2 provided between the liquid crystal panel A1 for displaying the image thereon and the light source A3, and further the light efficiency is reduced due to the necessity of inserting an additional polarizer film.

An observation distance ($L_o$) necessary for observing the 3D image is given in the following Equation 1.

$$L_o = (d \times E)/p \qquad \text{Equation 1}$$

In Equation 1, "$L_o$" represents a distance from an image surface of the liquid crystal panel A1 to viewer's eyes 26L and 26R, and "d" represents a distance from a surface of the liquid crystal shutter A2 to the image surface of the liquid crystal panel A1. Additionally, "E" represents a distance between viewer's left eye 26L and right eye 26R, and "p" represents a pixel pitch of the liquid crystal panel A1.

Generally, the pixel pitch (p) of the liquid crystal panel A1 is about 110 μm, and the distance (E) between both eyes 26L and 26R is about 65 mm. Additionally, considering that a rear glass plate of the liquid crystal panel A1 has a thickness of about 0.7 mm, a polarizer has a thickness of 0.2 mm, and the glass plate of the liquid crystal shutter A2 has the thickness of 0.7 mm, the distance (d) is calculated as 1.6 mm. This distance (d) should be converted into air thickness since the image reaches the viewer through air. For this, the distance 1.6 mm is divided by 1.52. If these values are applied to the Equation 1, the observation distance ($L_o$) necessary for observing the 3D image is about 622 mm {[((0.7 mm+0.2 mm+0.7 mm)/1.52)*65 mm]/0.11 mm}.

Referring to FIG. 3, the liquid crystal panel A1 includes a first polarizer 50, a first transparent substrate 52, a first Indium-Tin-Oxide (ITO) electrode 54 connected to the TFT, a first liquid crystal layer 56, a second ITO electrode 58 used as a common electrode, a second transparent substrate 60 and a 135° polarizer 62, which are arrayed in a sequence from left to right as shown in FIG. 3. Additionally, the liquid crystal shutter A2 includes a third transparent substrate 70, a third ITO electrode 72 connected to the TFT, a third liquid crystal layer 74, a fourth ITO electrode 76 used as the common electrode, a fourth transparent substrate 78 and a second polarizer 80, which are arrayed in a sequence from the liquid crystal panel A1 toward a light source A3. When the liquid crystal shutter A2 is in an on state, the incident light from the light source A3, that is, from the backlight, passes through the liquid crystal shutter A2 as it is, and when the liquid crystal shutter A2 is in an off state, a polarization direction of the incident light is rotated by 90°.

Considering the case that a personal LCD monitor is used as the 2D/3D display, the observation distance ($L_o$) is too long for a person observing with hands placed on a keyboard. Further, it is advantageous that the observation distance ($L_o$) is small in case that the 2D/3D display is applied to a personal mobile terminal such as a hand phone or a Portable Digital Assistant (PDA). Accordingly, in this aspect, it is difficult that the 2D/3D display shown in FIG. 2 is applied to the personal LCD monitor or the personal mobile terminal. Naturally, this drawback can be also solved by overcoming a difficulty in process to use a much thinner glass plate or a polymer substrate. However, since the liquid crystal shutter A2 of the 2D/3D display shown in FIG. 2 necessarily requires the polarizer film, it is difficult to achieve the light efficiency as desired by use of this solution.

Reference numerals L and R of FIG. 2 represents pixels of the liquid crystal panel A1. An image of a slit light source 22a seen through the pixel (L) is incident only on the viewer's left eye 26L, and the image of the slit light source 22a seen through the pixel (R) is incident only on the viewer's right eye 26R. Accordingly, the viewer feels the binocular disparity for the slit light source 22a, and views the 3D image.

As the observation distance and the light efficiency for the 3D image have become important factors, various 2D/3D displays have been introduced for improving them. FIG. 4 illustrates one example.

The 2D/3D display shown in FIG. 4 sequentially includes a retarder A5 and a liquid crystal shutter A4 patterned between the liquid crystal panel A1 for displaying the image thereon and the light source A3 for the purpose of shortening the observation distance, and is a structure diagram of a model recently shown to the market by Sharp. The retarder A5 allows the incident light having the same polarization direction as a fast axis of itself or the incident light having the polarization direction angled by 90° with respect to the fast axis to pass as it is, while as allowing the incident light having the polarization direction angled by 45° with respect to the fast axis. The liquid crystal shutter A4 includes a fifth transparent substrate 90, a fifth ITO electrode 92, a third liquid crystal layer 94, a sixth ITO electrode 96, a sixth transparent substrate 98 and a third polarizer 100, which are arrayed in a sequence of the retarder A5 toward the light source 30.

The conventional 2D/3D display has an excellent selectivity of the 2D and 3D images, but due to the use of the liquid crystal shutter having the same construction as the liquid crystal panel, in effect two liquid crystal panels are used. Accordingly, the conventional 2D/3D display is increased in thickness and power consumption. Further, the conventional 2D/3D display has a drawback in that the light efficiency is reduced since the polarizer film is necessarily additionally used due to a transmission-adjusting unit using the adjustment of polarized light.

SUMMARY OF THE INVENTION

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

A display consistent with the present invention provides a flat panel display for reducing an observation distance while maintaining an excellent selectivity for 2D and 3D images, and reducing its thickness, power consumption and light loss.

According to an aspect of the present invention, there is provided a 2D/3D (two-dimensional/three-dimensional) display including: an image display panel; and a light source configured to selectively emit light for displaying a two-dimensional image and light for displaying a three-dimensional image on the image display panel.

Herein, the image display panel can be a liquid crystal panel, and the light source can be a flat light source having an array of light emitting cells which are turned on and off depending on an applied voltage. In this case, the light emitting cells can be EL (Electro-Luminescence) cells.

In another aspect of the present invention, there is provided a 2D/3D display including: an image display panel; a light source; and a light switch unit disposed between the image display panel and the light source, and wherein the light switch unit comprises a light absorption unit to emit light incident from the light source to the image display panel for displaying a two-dimensional image or for displaying a three-dimensional image.

Herein the image display panel can be a liquid crystal panel, and the light source can be a flat light source having an array of light emitting cells which are turned on and off depending an applied voltage. The light emitting cells can be EL cells.

The light switch unit can include: a transparent lower electrode which oppositely faces to the light source; a transparent insulation layer which is formed on the lower electrode; an upper electrode which is formed to be spaced apart on the transparent insulation layer; the light absorption unit which is differently located depending on voltage applied to the upper and lower electrodes; and a transparent substrate which oppositely faces with the image display panel.

The light absorption unit can be a polarized toner.

In a further aspect of the present invention, there is provided a 2D/3D display including: an image display panel; a flat light source which has an array of light emitting cells turned on and off depending on an applied voltage; and a light switch unit disposed between the image display panel and the light source, wherein the light switch unit comprises a light absorption unit to emit light incident from the light source to the image display panel for displaying a two-dimensional image or for displaying a three-dimensional image.

Herein, the image display panel can be a liquid crystal panel, and the light emitting cells can be EL cells. Additionally, the light switch unit can include: a polarizer which oppositely faces with the light source; two transparent flats which are respectively in contact with the image display panel and the polarizer; two transparent electrodes which are respectively provided at internal surfaces of the two flats; and a liquid crystal which is filled between the two transparent electrodes.

The display by the present invention can be reduced in thickness and power consumption, and can reduce the observation distance.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EXEMPLARY, NON-LIMITING EMBODIMENTS OF THE INVENTION

Figure 1:
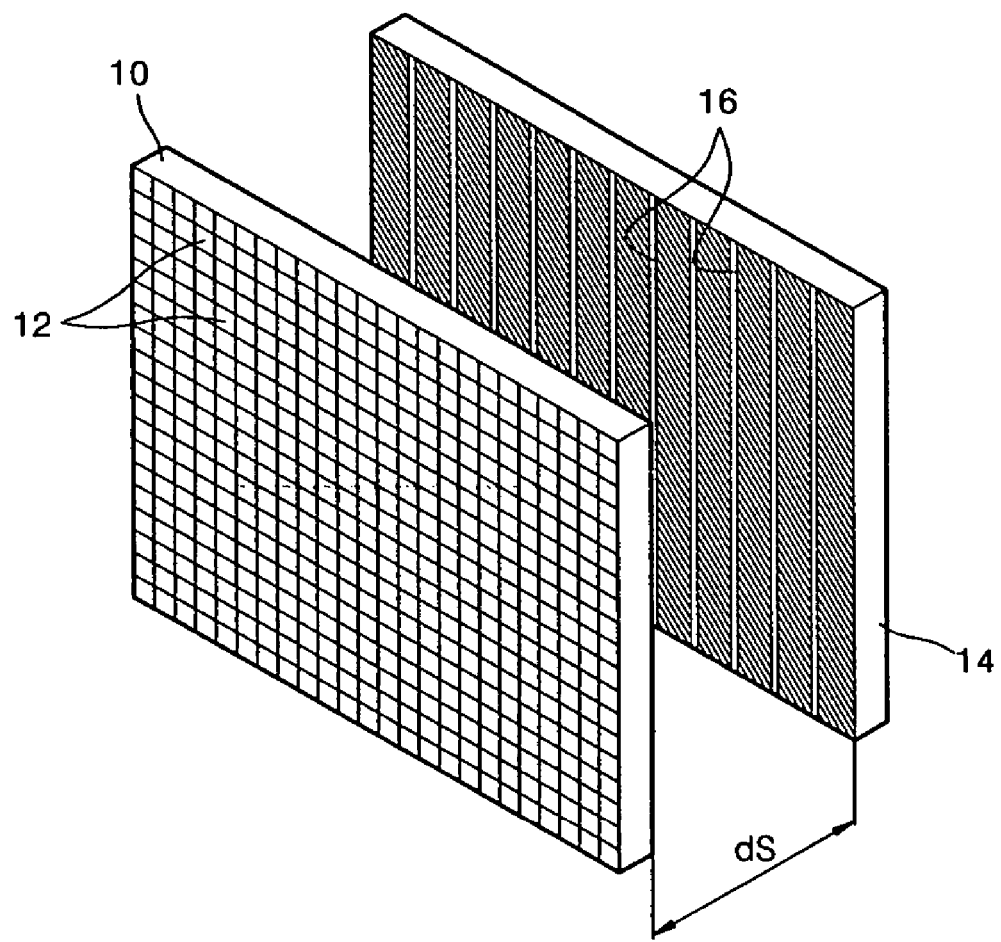
FIG. 1 is a schematic perspective view illustrating a conventional 3D-image exclusive flat panel display.
Figure 2:
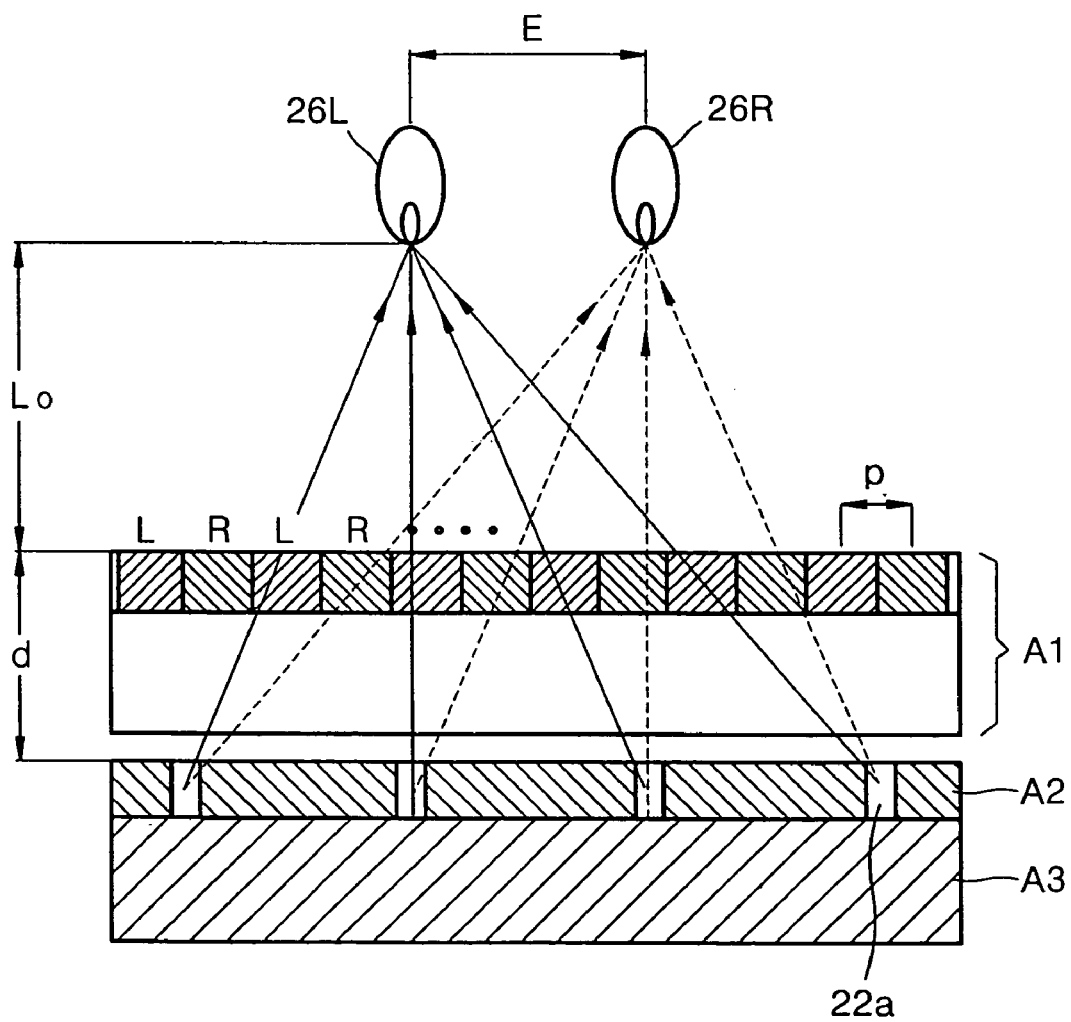
FIGS. 2 and 3 are plan views illustrating a conventional flat panel display for selectively displaying 2D and 3D images.
Figure 3:
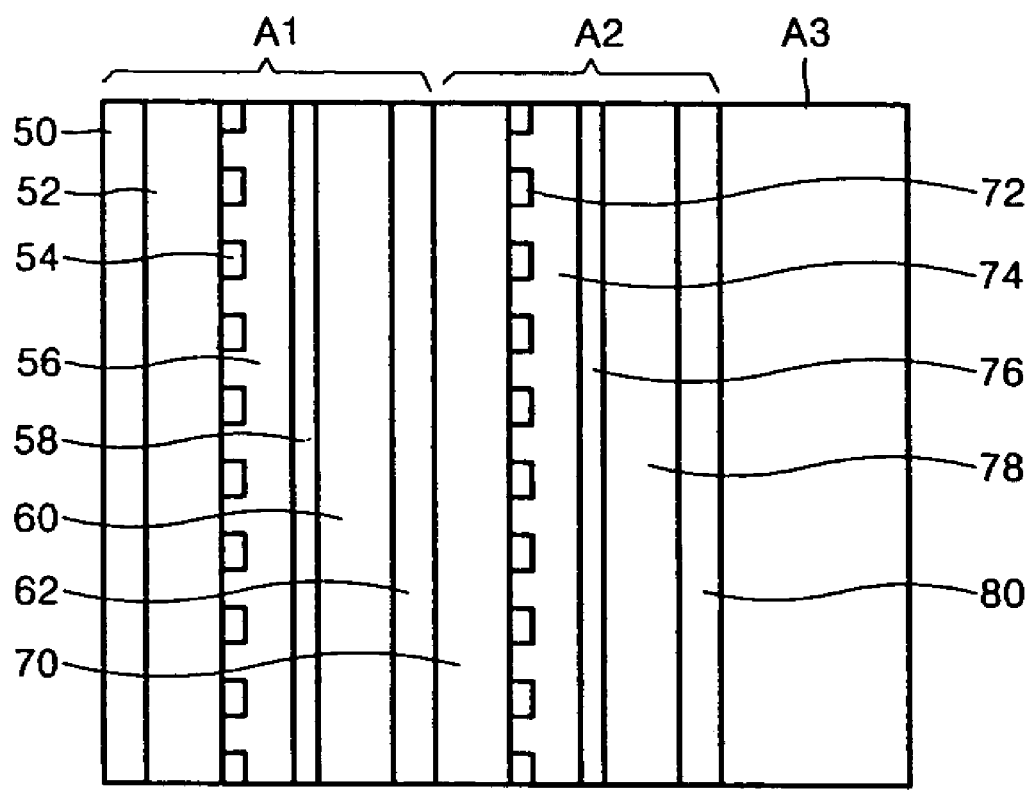
Figure 4:
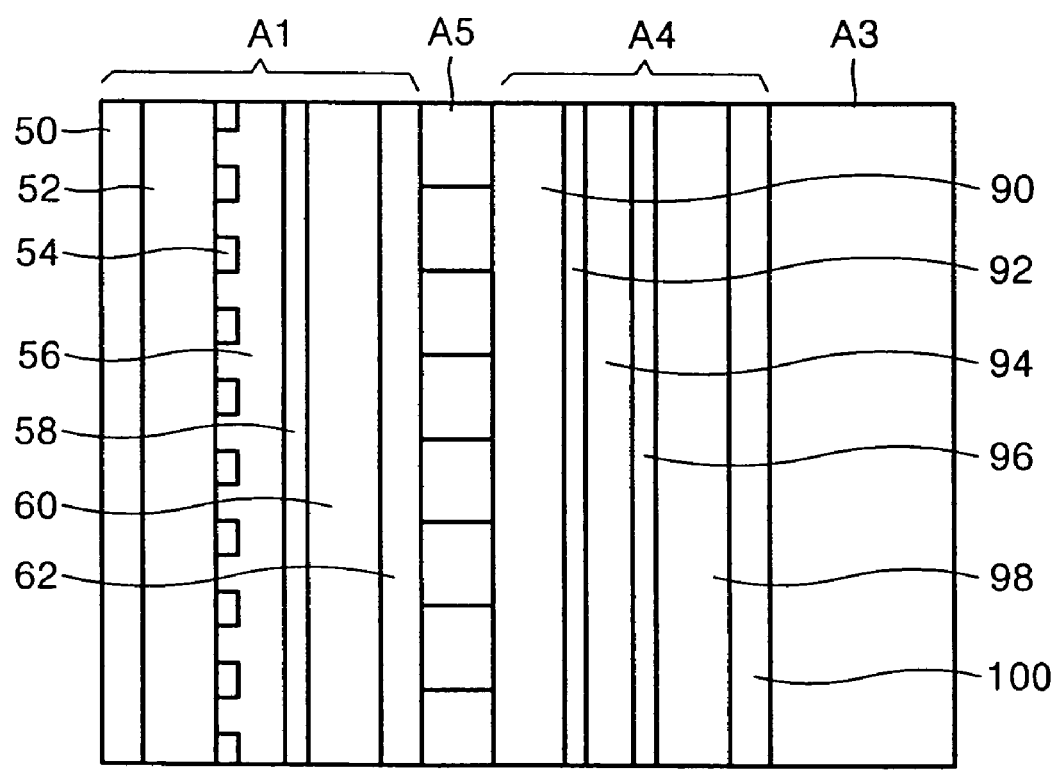
FIG. 4 is a plan view illustrating a conventional flat panel display for selectively displaying 2D and 3D images with a liquid crystal shutter and a retarder.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses of layers and regions are exaggerated for clarity.

First Embodiment

Figure 6:
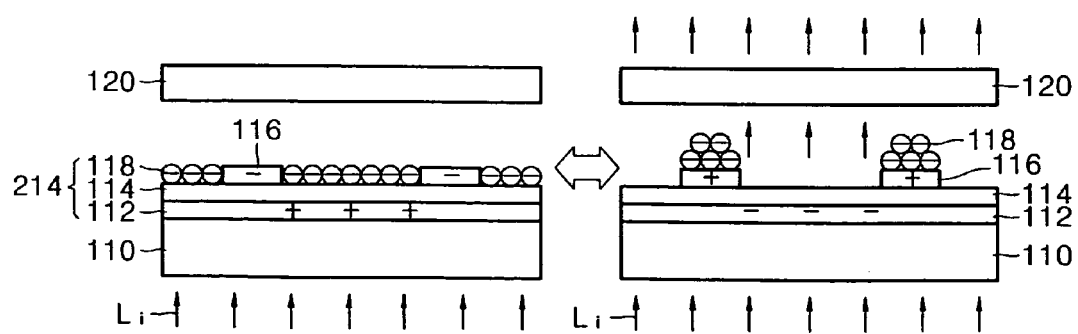
FIG. 6 is a sectional view illustrating a procedure of forming lights for 2D and 3D images in a flat panel display for selectively displaying 2D and 3D images consistent with a first embodiment of the present invention.

As shown in FIG. 6, a 2D/3D display consistent with a first embodiment of the present invention (hereinafter referred to as "first display") includes a light switch unit for displaying light emitted from a light source as light for a 2D image and light for a 3D image.

Figure 5:
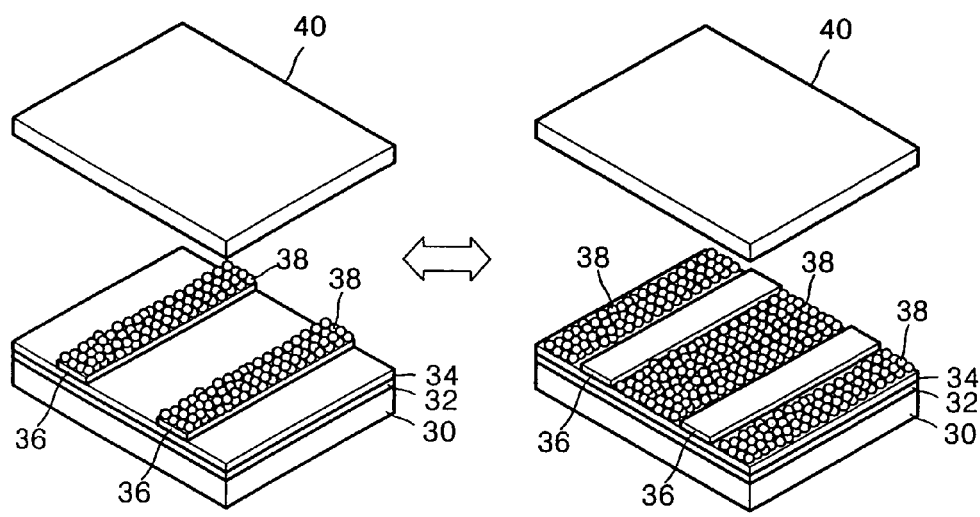
FIG. 5 is a perspective view illustrating an operation of a unit pixel of a reflective light switch unit applied to a flat panel display for selectively displaying 2D and 3D images consistent with a first embodiment of the present invention.

The light switch unit shown in FIG. 6 applies a light switch unit as shown in FIG. 5.

The light switch unit shown in FIG. 5 scatters and again emits an external incident light. The light switch unit determines whether or not to emit the light depending on the distribution of a polarized absorption toner, and is used as a display of an e-book.

Referring to FIG. 5, the light switch unit includes a lower substrate 30, a lower electrode 32 and a light scattering layer 34, which are sequentially layered. They construct one pixel. The light scattering layer 34 scatters the light incident through an upper substrate 40 provided thereover to reflect the scattered light to the upper substrate 40. The upper substrate 40 is spaced apart from the light scattering layer 34. Upper electrodes 36 spaced apart from one another are provided on the scattering layer 34. A reference numeral 38 represents a polarized toner for absorbing the light incident through the upper substrate 40. Due to the polarization of the toner 38, the toner 38 can be provided on the upper electrode 36 or on the light scattering layer 34 between the upper electrodes 36, depending on a voltage applied to the lower electrode 32 and the upper electrode 36 as shown in the drawings.

As shown at a left side of FIG. 5, in case that the voltage is applied to the lower electrode 32 and the upper electrode 36 such that the toner 38 is provided on the upper electrode 36, the light scattering layer 34 scatters the external light to be seen in white colour.

In detail, the light incident through the upper substrate 40 is scattered in the light scattering layer 34 between the upper electrodes 36 to be again reflected toward the upper substrate 40. At this time, since the light incident on the upper electrode 36 is absorbed, an upper electrode 36 region can be seen in black colour.

However, since a width of the upper electrode 36 is much narrower than a width of the light scattering layer 34 provided between the upper electrodes 36, the light is seemingly emitted from an entire surface of the light scattering layer 34 including the upper electrode 36 region.

As shown at a right side of the FIG. 5, in case that the voltage is applied to the lower electrode 32 and the upper electrode 36 such that the toner 38 is provided on the entire surface of the light scattering layer 34 between the upper electrodes 36, the polarized toner absorbs all the external incident light such that the light scattering layer 34 is seen in black colour.

Describing the above case in detail, since the toner 38 is provided on the entire surface of the light scattering layer 34 between the upper electrodes 36, the light incident on the light scattering layer 34 between the upper electrodes 36 among the light incident through the upper substrate 40 are all absorbed by the toner 38. On the contrary, after the light incident on the upper electrode 36 among the light incident through the upper substrate 40 passes through the upper electrode 36 and is scattered in the light scattering layer 34, the scattered light again passes through the upper electrode 36 and the upper substrate 40 for emission. However, since the width of the upper electrode 36 is much narrower than the width of the light scattering layer 34 between the upper electrodes 36, this upper electrode 36 portion is shaded by elements distinguishing cells, any light is not emitted to an externally.

This embodiment employs a light switch unit, that is, it transforms into a transmission switch unit to implement a unit for converting the light emitted from the light source of the 2D/3D display into the light for the 2D or 3D image (hereinafter referred to as "light source forming unit for 2D and 3D images").

FIG. 6 illustrates a portion of a pixel constructing the light source-forming unit for the 2D and 3D images.

Referring to FIG. 6, the light source-forming unit for the 2D and 3D images includes a transparent lower substrate 110, a transparent lower electrode 112 and a transparent insulation layer 114, which are sequentially layered. Additionally, it includes upper electrodes 116 spaced apart at a predetermined distance on the transparent insulation layer 114. Further, the light source-forming unit for the 2D and 3D images includes a transparent upper substrate 120 for maintaining a predetermined gap with and over the transparent insulation layer 114. The light source forming unit for the 2D and 3D images provided for the inventive first display includes a light absorption unit 118 which is provided on an entire surface of the transparent insulation layer 114 between the upper electrodes 116 as shown at a left side of the drawing or provided only on the upper electrode 116 as shown at a right side of FIG. 6 depending on the voltage applied to the upper electrode 116 and the lower electrode 112. The light absorption unit 118 may be the toner, but does not have to be. Accordingly, the light absorption unit 118 is hereinafter referred to as the toner.

As shown at the left side of FIG. 6, in a case wherein the toner 118 is charged negatively (−), and a negative (−) voltage and a positive (+) voltage are respectively applied to the upper electrode 116 and the lower electrode 112 (hereinafter referred to as a first case), the toner 118 is distributed on the surface of the transparent insulation layer 114 between the upper electrodes 116. Accordingly, in the first case, the light incident on the upper electrode 116 among the light ($L_i$) incident on the transparent insulation layer 114 through the lower substrate 110 and the lower electrode 112 from the underside of the lower substrate 110 passes through the upper electrode 116 and the upper substrate 120 for upward emission. However, since the width of the upper electrode 116 is much narrower than the width of the transparent insulation layer 114 between the upper electrodes 116, and is shaded by the element distinguishing the cells, the viewer cannot externally observe the emitted light. On the contrary, the toner 118 absorbs the light incident on the transparent insulation layer 114 between the upper electrodes 116 not to allow the incident light to be emitted through the upper substrate 120. As such, the first case functions as the light switch unit for completely shading the light from the backlight.

As shown at the right side of the FIG. 6, in case that the positive (+) voltage and the negative (−) voltage are applied to the upper electrode 116 and the lower electrode 112 (hereinafter referred to as a second case), the toner 118 is provided on the upper electrode 116. Therefore, the toner 118 absorbs the entire light incident on the upper electrode 116 among the light incident on the transparent insulation layer 114 through the lower substrate 110 and the lower electrode 112, and the light incident on the transparent insulation layer 114 between the upper electrodes 116 passes through the upper substrate 120 for emission. Since the width of the upper electrode 116 is much narrower than the width of the transparent insulating layer 114, the light emitted through the transparent insulation layer 114 between the upper electrodes 116 is seemingly practically emitted from the entire surface of the transparent insulation layer 114.

As such, each pixel of the light source forming unit for the 2D and 3D images transmits or shades the light depending on the voltage applied to the upper electrode 116 and the lower electrode 112. Therefore, the pixels included in the light source forming unit for the 2D and 3D images are selectively controlled for the first case or the second case such that the light for the 2D image or the light for the 3D image can be emitted from the light source forming unit for the 2D and 3D images.

Figure 7:
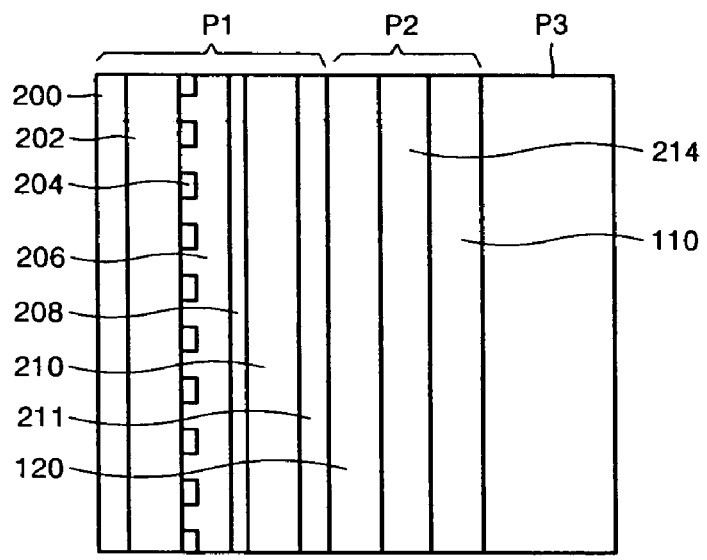
FIG. 7 is a plan view illustrating a flat panel display having an element for forming lights for 2D and 3D images consistent with a first embodiment of the present invention.

FIG. 7 illustrates a construction of the inventive first display having the light source-forming unit for the 2D and 3D images shown in FIG. 6.

Referring to FIG. 7, the inventive first display includes the liquid crystal panel P1 for displaying a view image, the light source forming unit P2 for the 2D and 3D images (hereinafter referred to as "light source forming unit") provided at a rear of the liquid crystal panel P1, and a light source P3 for emitting the light to the light source forming unit P2, for example, a backlight.

The liquid crystal panel P1 includes a front polarizer 200, a transparent front substrate 202, a front ITO electrode 204 connected to the switch unit, for example, to the TFT, a liquid crystal layer 206, a common electrode 208, a transparent rear substrate 210 and a rear polarizer 211. The front polarizer 200 polarizes the incident light by 45°, and the rear polarizer 211 polarizes the light incident from the light source forming unit P2 by 135°. The light source-forming unit P2 includes an upper substrate 120 and a lower substrate 110, and includes an element 214 for selectively emitting the light for the 2D and 3D images between the upper and lower substrates 120 and 110. A construction of the element 214 is referred to FIG. 6.

Figure 8:
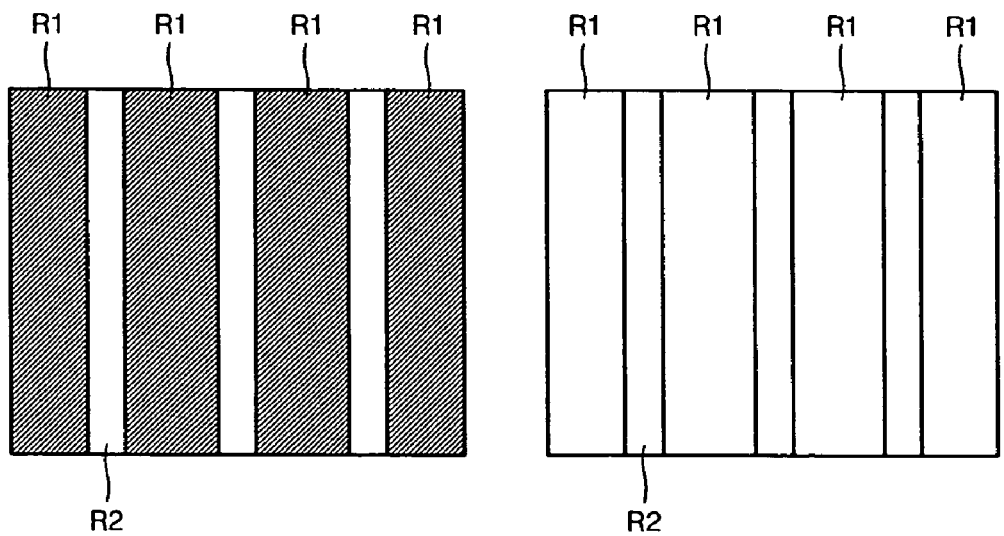
FIG. 8 is a view illustrating distributions of light for a 2D image and light for 3D image, which are emitted from a light source-forming unit in a flat panel display shown in FIG. 7.

A left side of FIG. 8 illustrates a profile of the light emitted from the light source forming unit P2 when the light source forming unit P2 is used as the light source for the 3D image, that is, when the toner 118 absorbing the light is distributed on the entire surface of the transparent insulation layer 114 between the upper electrodes 116 as shown at the left side of FIG. 6. Additionally, a right side of the FIG. 8 illustrates a profile of the light emitted from the light source forming unit P2 when the light source forming unit P2 is used as the light source for the 2D image, that is, when the toner 118 for absorbing the light is provided on the upper electrode 116 as shown at the right side of FIG. 6. At the left side of FIG. 8, a first region R1 corresponds to the first case of FIG. 6, and a second region R2 corresponds to the second case of FIG. 6.

Figure 9:
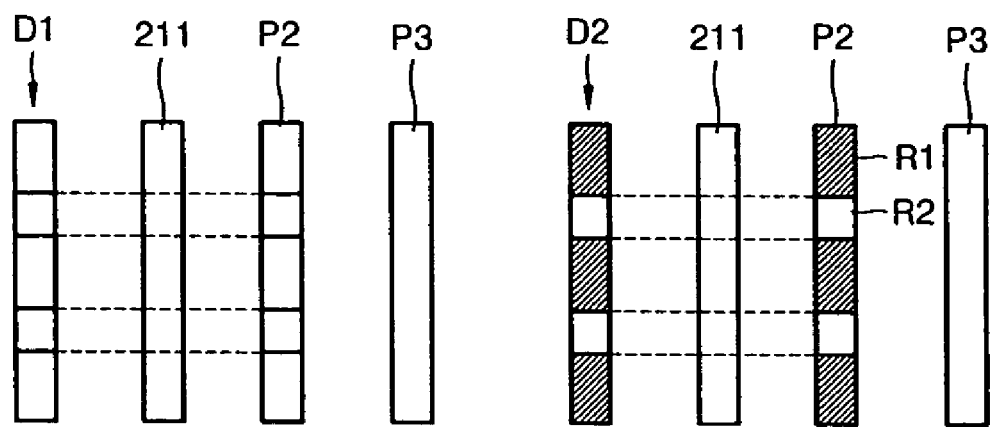
FIG. 9 is a plan view illustrating distributions of light for a 2D image and light for a 3D image passing through a rear surface polarizer of a liquid crystal panel in a flat panel display shown in FIG. 7.

FIG. 9 illustrates a transmission light distribution of the inventive first display shown in FIG. 8. A left side of FIG. 9 illustrates a distribution D1 of the light transmitting from the rear polarizer 211 of the liquid crystal panel P1 when the inventive first display is used to implement the 2D image. A right side of FIG. 9 illustrates a distribution D2 of the light transmitting from the rear polarizer 211 of the liquid crystal panel P1 when the inventive first display is used to implement the 3D image.

Second Embodiment

A description for the same elements as in the first embodiment is omitted, and the same reference numerals (symbols) as in the first embodiment are used to illustrate similar elements.

Figure 10:
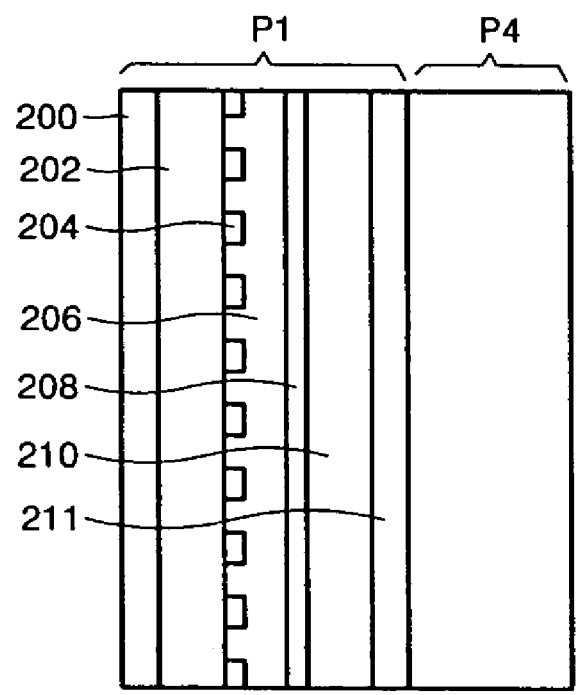
FIG. 10 is a plan view illustrating a flat panel display for selectively displaying 2D and 3D images consistent with a second embodiment of the present invention.

Referring to FIG. 10, a 2D/3D display according to a second embodiment (Hereinafter, referred to as the inventive second display) includes a liquid crystal panel P1, and a light source P4 for selectively emitting light for 2D and 3D images to the liquid crystal panel P1. The light source P4 may be exemplified as an Electro-Luminescence (EL) unit including an EL cell shown in FIG. 11. A plurality of EL cells included in the EL unit forms an EL cell array such as a TFT array of the liquid crystal panel. Accordingly, a signal is applied to an addressing line of the EL unit such that the EL cell can be selected at a desired position. Since this method can be used to select all of the EL cells from the EL cell array and to select only the EL cell of one row or one column, the EL unit can be used as the light source for the 2D image or the light source for the 3D image. That is, since the light is emitted from an entire surface of the EL unit in case that all of the EL cells constructing the EL cell array are selected to apply voltage, the EL unit can be used as the light source for the 2D image. Additionally, since each column corresponds to a slit or a line in the EL cell array, the light is emitted only from the selected columns in case that columns spaced apart at a predetermined gap are selected in the EL cell array to apply the voltage, and therefore the EL unit can be used as the light source for the 3D image.

Generally considering light efficiency and crosstalk, it is known to be appropriate that a ratio of a width between rod sources to a width of the rod source itself is 2:1. In a case the EL unit is used as the light source for the 3D image, the ratio can be simply maintained through addressing, and also the ratio is maintained while the width of the rod source and the width between the rod sources can also be varied.

A general colour display device is described above, but the liquid crystal panel P1 is a white/black liquid crystal panel without a colour filter, and a light source P4 can also be a light emitting unit for 2D and 3D images for emitting monochromatic light, for example, a monochromatic EL unit. In this case, since the monochromatic light EL unit has the same driving principle as white light, the monochromatic EL unit is driven to be the light source for the 2D image or the light source for the 3D image as described above, the monochromatic 2D or 3D image can be embodied.

Figure 11:
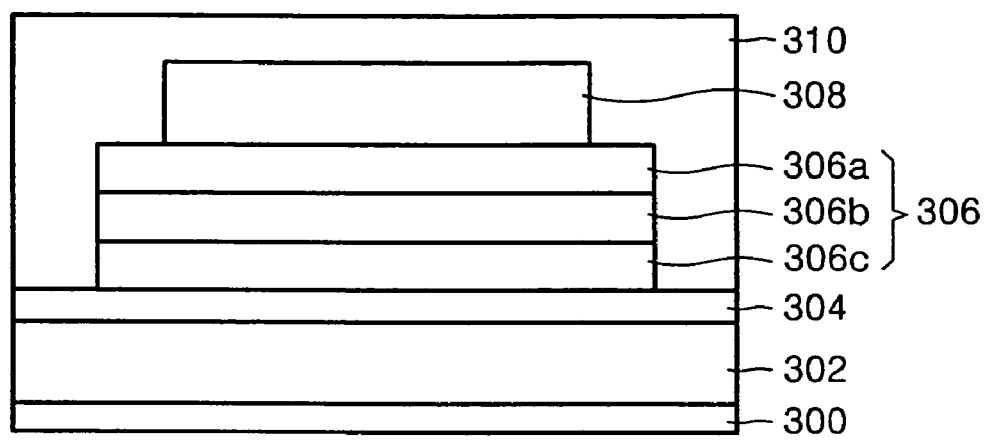
FIG. 11 is a sectional view illustrating an electro-luminescence cell used for a light source of a flat panel display shown in FIG. 10.

FIG. 11 illustrates the EL cell of the EL unit used as the light source P4 of the inventive second display. Referring to FIG. 11, the EL cell includes a polarizer 300, a lower substrate 302 and a lower electrode 304, which are sequentially layered. The polarizer 300 functions to improve a white/black contrast and protect an EL layer 306, to be described below, from an external light. The EL cell is attached to the liquid crystal panel P1 by using the polarizer 300 as its contact surface. The lower substrate 302 can be a transparent substrate such as a glass substrate or a polymer substrate, for example. Further, the EL cell includes the EL layer 306 on the lower electrode 304, and includes the upper electrode 308 on the EL layer 306. The EL layer 306 includes an electron transfer layer 306c, a light emitting layer 306b and a hole transfer layer 306a, which sequentially layered. The EL layer 306 and the upper electrode 308 are covered with a passivation film 310.

The EL cell can emit white light depending on a material constructing the EL layer 306, can emit each of red (R), green (G) and blue (B) lights, and can also emit the R, G, and B lights depending on a kind of a color change material provided on the material for emitting the blue (B) light.

Figure 12:
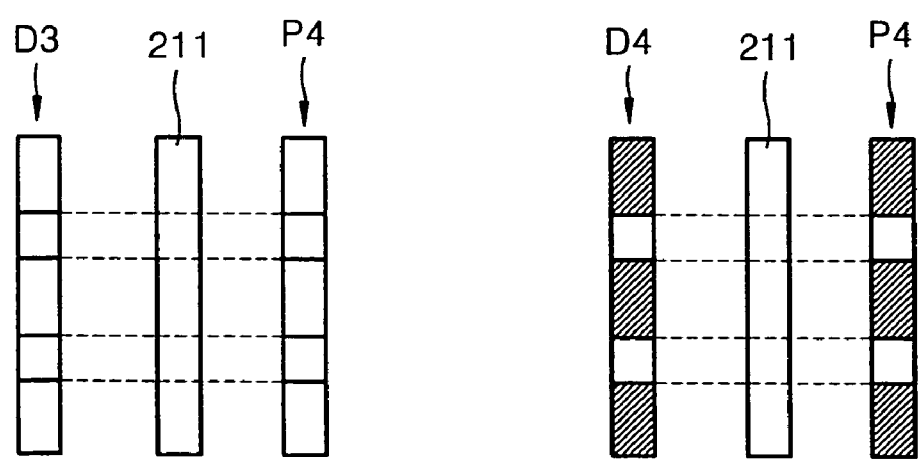
FIG. 12 is a plan view illustrating distributions of light for a 2D image and light for a 3D image passing through a rear surface polarizer of a liquid crystal panel in a flat panel display shown in FIG. 11.

FIG. 12 illustrates a distribution of the light transmitting through the rear polarizer 211 of the liquid crystal panel P1 when the inventive second display is used for the 2D image and when the inventive second display is used for the 3D image.

Referring to a left side of FIG. 12, when the inventive second display is used for the 2D image, it can be appreciated that a distribution D3 of the light at the time of passing through the rear polarizer 211 is regular at an entire region.

Referring to a right side of FIG. 12, when the inventive second display is used for the 3D image, it can be appreciated that a distribution D4 of the light after passing through the rear polarizer 211 has the light only in a region corresponding to the rod source of the light source P4.

As described above, since the display consistent with the present invention can use the same light source for the 2D image and for the 3D image, it does not require a separate light select unit for selecting the light source for the 2D image and the light for the 3D image such as a conventional liquid crystal shutter. Accordingly, a display consistent with the present invention can be reduced in size, and can reduce the observation distance.

Further, the display by the present invention can select the region needing the light source to emit the light source for the 2D image or the 3D image. That is, in case that it is intended to emit the light for the 3D image, the light can be emitted not from the entire light source, but only from the region where the light for the 3D image is practically emitted. Therefore, a display consistent with the present invention can reduce light loss and power loss in comparison to the conventional display where the light is always emitted across the entire region without a classification for the 2D image or the 3D image.

Furthermore, the display by the present invention can arbitrarily control the width of the rod source and the width between the rod sources. Accordingly, a display consistent with the present invention can effectively form the light for the 3D image in comparison to the conventional art.

Additionally, in case that a passivation substrate having a thin thickness is used instead of the upper substrate 120 in FIG. 6, the observation distance can be further reduced.

The detailed descriptions are made for many elements as above, but they should be defined as an example of a preferred embodiment, rather than limiting the scope of the present invention. For example, those of ordinary skill in the art can use the light source for the 2D and 3D images instead of the EL unit. Further, the above-described first and second embodiments can be also incorporated. For example, the EL unit provided for the display according to the second embodiment of the present invention is used only as the light source for the 2D image such as the conventional backlight, and the 2D/3D display can be provided including the light source forming unit P2 shown in FIG. 7 between the EL unit and the liquid crystal panel. Therefore, the scope of the present invention should not be determined by the described embodiments, and should be determined by a technical spirit defined in claims.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A 2D/3D (two-dimensional/three-dimensional) display comprising:
   an image display panel; and
   a light source configured to selectively emit light for displaying a two-dimensional image and light for displaying a three-dimensional image on the image display panel,
   wherein the light source is a flat light source having an array of light emitting cells which are turned on and off depending on an applied voltage.

2. The 2D/3D display of claim 1, wherein the image display panel is a liquid crystal panel.

3. The 2D/3D display of claim 1, wherein the light emitting cells are EL (Electro-Luminescence) cells.

4. A 2D/3D (two-dimensional/three-dimensional) display comprising:
   an image display panel;
   a light source; and
   a light switch unit disposed between the image display panel and the light source,
   wherein the light switch unit comprises a light absorption unit configured to emit light incident from the light source to the image display panel for displaying a two-dimensional image or for displaying a three-dimensional image,
      wherein the light absorption unit is located in different positions depending on whether it emits light for displaying a two-dimensional image or a three-dimensional image.

5. The 2D/3D display of claim 4, wherein the image display panel is a liquid crystal panel.

6. The 2D/3D display of claim 4, wherein the light source is a flat light source having an array of light emitting cells which are turned on and off depending on an applied voltage.

7. The 2D/3D display of claim 6, wherein the light emitting cells are EL (Electro-Luminescence) cells.

8. The 2D/3D display of claim 4, wherein the light absorption unit is a polarized toner.

9. A 2D/3D (two-dimensional/three-dimensional) display, comprising;
   an image display panel;
   a light source; and
   a light switch unit disposed between the image display panel and the light source,
   wherein the light switch unit comprises a light absorption unit configured to emit light incident from the light source to the image display panel for displaying a two-dimensional image or for displaying a three-dimensional image,
      wherein the light switch unit further comprises:
      a transparent lower electrode which oppositely faces to the light source;
      a transparent insulation layer formed on the lower electrode;
      a plurality of upper electrodes disposed on the transparent insulation layer so as to be spaced apart on the transparent insulation layer;
      the light absorption unit which is differently located depending on voltage applied to the upper and lower electrodes; and
      a transparent substrate which oppositely faces with the image display panel.

10. The 2D/3D display of claim 9, wherein the light absorption unit is a polarized toner.

11. A 2D/3D (two-dimensional/three-dimensional) display comprising:
    an image display panel;
    a flat light source which has an array of light emitting cells turned on and off depending on an applied voltage; and
    a light switch unit disposed between the image display panel and the light source,
    wherein the light switch unit comprises a light absorption unit to emit light incident from the light source to the image display panel for displaying a two-dimensional image or for displaying a three-dimensional image.

12. The 2D/3D display of claim 11, wherein the image display panel is a liquid crystal panel.

13. The 2D/3D display of claim 11, wherein the light emitting cells are EL cells.

14. The 2D/3D display of claim 11, wherein the light switch unit comprises:
    a polarizer which oppositely faces with the light source;
    two transparent flats which are respectively in contact with the image display panel and the polarizer;
    two transparent electrodes which are respectively provided at internal surfaces of the two flats; and
    a liquid crystal which is filled between the two transparent electrodes.

* * * * *